Feb. 12, 1952 K. R. WENDT ET AL 2,585,883

COMBINATION SECOND DETECTOR, NOISE LIMITER, AND GAIN CONTROL CIRCUIT

Filed Aug. 10, 1946 3 Sheets-Sheet 1

INVENTORS
KARL R. WENDT
GEORGE C. SZIKLAI
BY H. S. Grover
ATTORNEY

Feb. 12, 1952

K. R. WENDT ET AL

COMBINATION SECOND DETECTOR, NOISE LIMITER, AND GAIN CONTROL CIRCUIT 2,585,883

Filed Aug. 10, 1946

3 Sheets-Sheet 2

INVENTORS
KARL R. WENDT
GEORGE C. SZIKLAI
BY H. S. Grover
ATTORNEY

INVENTORS
KARL R. WENDT
GEORGE C. SZIKLAI
BY
H. S. Grover
ATTORNEY

Patented Feb. 12, 1952

2,585,883

UNITED STATES PATENT OFFICE 2,585,883

COMBINATION SECOND DETECTOR, NOISE LIMITER, AND GAIN CONTROL CIRCUIT

Karl Rinner Wendt, Hightstown, and George Clifford Sziklai, Princeton, N. J., assignors to Radio Corporation of America, a corporation of Delaware Application August 10, 1946, Serial No. 689,654

9 Claims. (Cl. 178—7.3)

The present invention relates to television receiving systems, and more particularly relates to a demodulating circuit for such systems which supplies not only a detected video signal for the image-reproducing device, but, in addition, provides both synchronizing (commonly called "sync") and automatic gain control voltages for respective application to the deflection and intermediate-frequency or radio frequency amplifier portions of the television receiver.

In accordance with one embodiment of the present invention, a demodulator, or second detector, is provided which includes two grid-controlled electron discharge devices, the cathodes of which are coupled directly together. These electron discharge devices may comprise separate tubes, or else they may be enclosed in a common envelope. The grid of one of these tubes is connected to receive the output of the I. F. (intermediate frequency) amplifier of the receiver. The second tube, in one possible mode of operation, is biased to cut-off under the condition when no signal is being received by the first tube from the I. F. amplifier.

Upon reception of such an I. F. signal, the cut-off tube acts as a detector, and a demodulated video appears across an output resistor in the tube plate circuit. Also, the voltages on this tube are so chosen that grid current flows during the peaks of the I. F. signal. Since these peaks constitute the sync (also heretofore frequently called "synchronizing") pulses (according to present standards of television transmission), this flow of grid current through the grid resistor results in the production of a varying voltage which is representative of the synthesizing information contained in the received television signal. No video component appears along with the sync pulses, since grid current does not flow until the input voltage rises above that level in the video signal corresponding to black. Furthermore, a D.-C. voltage is also developed across the second tube grid resistor, this voltage having an instantaneous value dependent upon the height of the sync pulses and hence on the amplitude of the carrier wave regardless of video content. It may, accordingly, be employed as an AGC (automatic gain control) voltage to control the gain of the I. F. amplifiers of the television receiver.

By so adjusting the relative bias on the two tubes that the carrier wave swings to the cut-off level of the first tube at full amplitude, the circuit then acts as a limiter to remove all noise or other high frequency disturbances which extend beyond the top of the sync pulses. This tends to improve materially the overall quality of the reproduced image.

One object of the present invention, therefore, is to provide an improved form of second detector for television systems.

Another object of the invention is to provide a second detector for television receiving systems which also furnishes, with a minimum number of components, both synchronizing and automatic gain control voltages.

A further object of the invention is to provide a demodulator for use in television receiving systems which possesses a limiting action, so that noise components extending above a predetermined level are substantially eliminated.

Other objects and advantages will be apparent from the following description of preferred forms of the invention and from the drawings, in which.

Figures 1, 2:
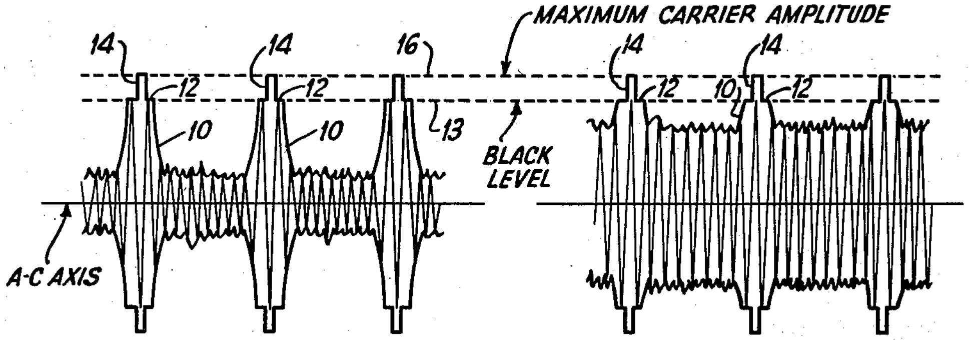
Figs. 1 and 2 illustrate a carrier wave modulated respectively by light and dark video signals, as well as by sync pulses.

The characteristics of the transmitted signal on which the present invention is dependent are illustrated in Figs. 1 and 2, which show a carrier wave modulated by a light video signal (light background), and by a dark video signal (dark background), respectively. The modulating video signal constitutes the envelope of the carrier wave. The horizontal, or line, blanking signals which are transmitted at the end of each scanning line are indicated by the reference numeral 10, and are sometimes referred to as "pedestals."

The top portion 12 of each pedestal always reaches a certain level in the transmitted signal, such as the level 13 which corresponds to black in the reproduced image, or a certain amount beyond this black level. A synchronizing pulse 14 is set on the top portion 12 of each pedestal 10. A system operating in accordance with the above principles is disclosed in United States Patent No. 2,192,121, issued February 27, 1940, to A. V. Bedford, and reference is made to this patent for a more complete description of the waveform characteristics of Figs. 1 and 2.

As indicated in the drawing, so-called negative modulation by the synchronizing pulses is employed. In other words, the synchronizing pulses 14 (which extend into the "blacker-than-black" signal region) utilize the maximum amplitude of the carrier wave.

It will be noted from Figs. 1 and 2 that a change from a light image to a dark image does not cause a change in the amplitude or height of the synchronizing pulses 14. These synchronizing pulses 14 will vary in amplitude only as a result of fading or attenuation of the transmitted signal which lowers the maximum carrier amplitude level 16. Accordingly, this fact is utilized, in accordance with the present invention, to derive a gain control voltage which has a value dependent upon the height of the synchronizing pulses, and which is completely independent of the background of the image being transmitted. In other words, the AGC voltage developed by the system of the present invention is independent of the video content of the transmitted signal.

Figure 3:
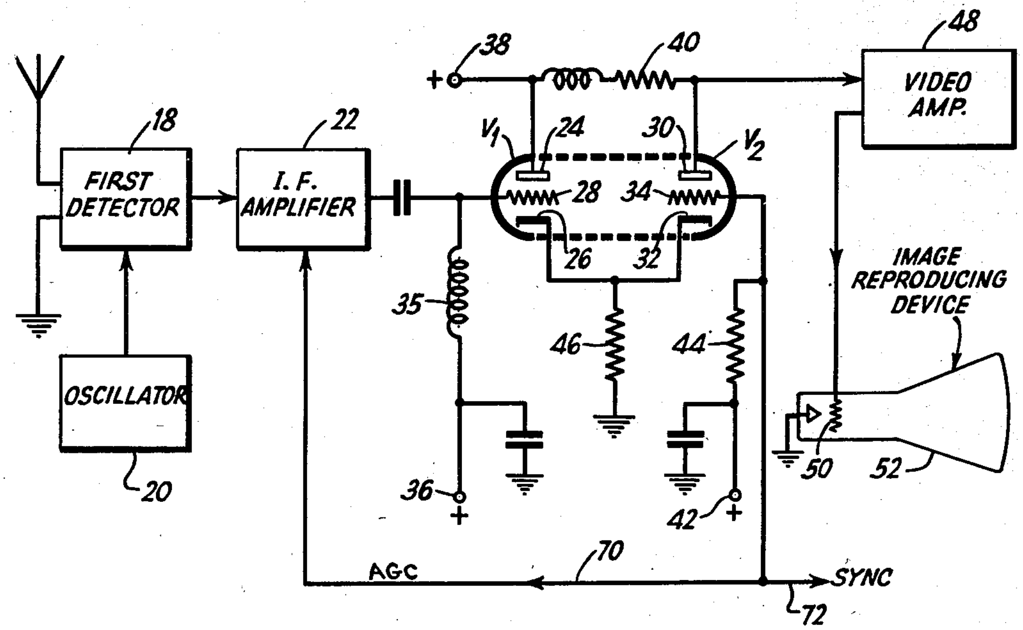
Fig. 3 is a circuit diagram of a preferred embodiment of the present invention.

Referring now to Fig. 3, one modification of the present invention is shown applied to a television receiver of the superheterodyne type. The receiver comprises a first detector 18, (preceded by one or more radio frequency stages, not shown, where desired) a tunable oscillator 20, and an intermediate-frequency amplifier 22, which usually consists of a plurality of amplifier stages. The modulated I. F. carrier, which is of the character shown in Figs. 1 and 2, is supplied from the I. F. amplifier 22 to a second detector which includes two grid-controlled electron discharge devices $V_1$ and $V_2$.

As shown in Fig. 3, tube $V_1$ contains at least an anode 24, a cathode 26, and a control electrode 28. Tube $V_2$ contains at least an anode 30, a cathode 32, and a control electrode 34. The I. F. signal output of the amplifier 22 is applied to the control electrode 28 of tube $V_1$ which is biased through an impedance 35 from a source of positive potential (not shown) connected to the terminal 36. The anode 24 of tube $V_1$ is supplied with a suitable operating potential from a source (not shown) connected to the terminal 38.

Tube $V_2$ has its anode 30 also connected to the terminal 38 of the source of operating potential through means including a load resistor 40. The control electrode 34 of tube $V_2$ is connected to one terminal 42 of a suitable source of bias potential (not shown) through a grid resistor 44. The cathode 26 of tube $V_1$ is joined directly to the cathode 32 of tube $V_2$, and these two joined cathodes 26 and 32 are connected to ground through a cathode resistor 46.

The output of tube $V_2$ as developed across the load resistor 40 is supplied to a video amplifier 48 consisting of one or more stages. The output of video amplifier 48 is applied with proper polarity to the control element 50 of an image-reproducing device such as the cathode ray tube 52.

Figures 4, 5:
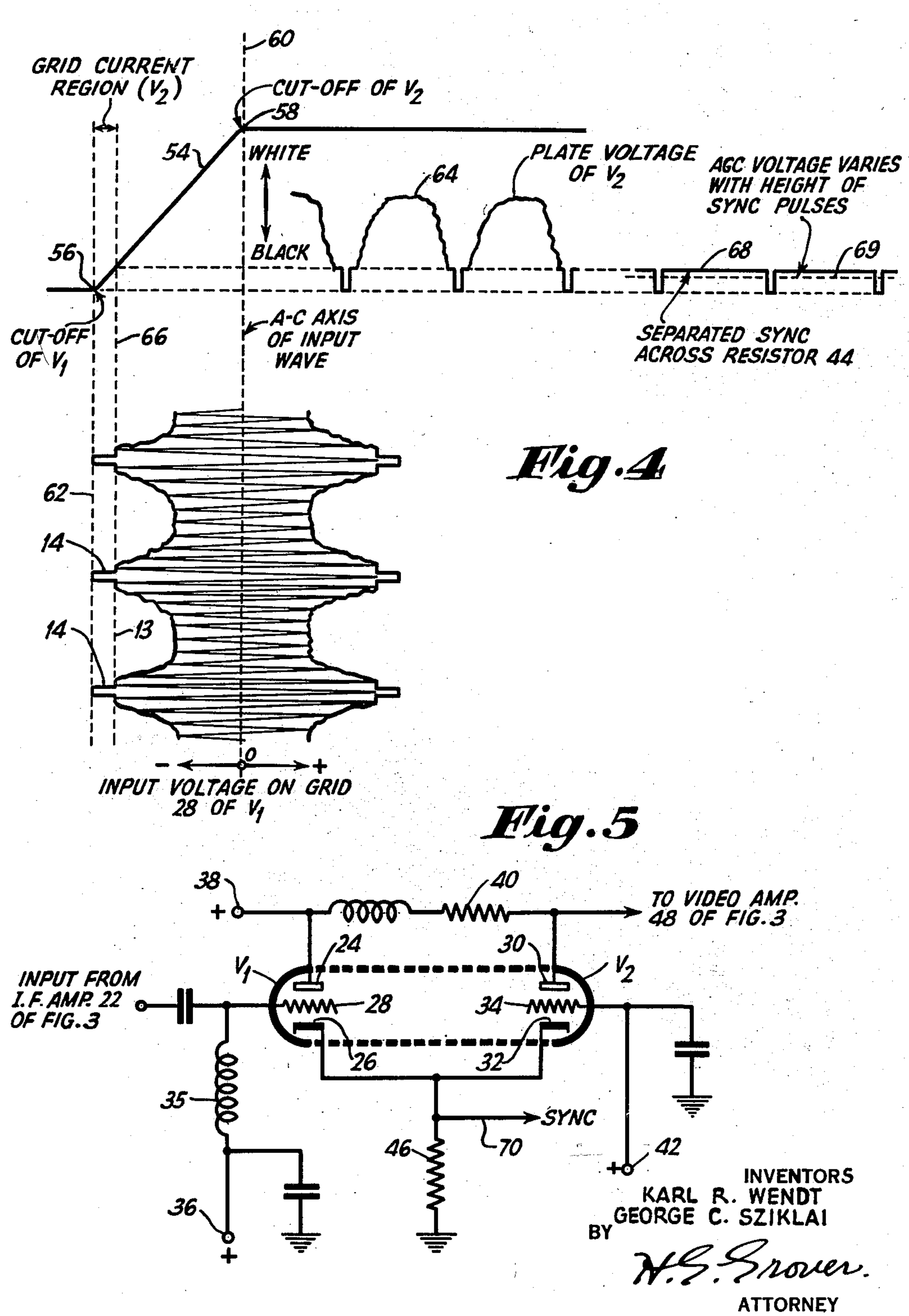
Fig. 4 is a graph referred to in explaining the operation of the system of Fig. 3.
Fig. 5 illustrates a modification of the circuit of Fig. 3.

In describing the operation of the circuit of Fig. 3, reference is made to the curves of Fig. 4. It will be noted from this latter figure that the combined plate current vs. grid-voltage characteristic of the tubes $V_1$ and $V_2$ includes an operating portion 54 lying between two cut-off points 56 and 58, the former constituting the cut-off point of the tube $V_1$, and the latter constituting the cut-off point of the tube $V_2$. Tubes $V_1$ and $V_2$ are so selected that these cut-off points 56 and 58 are relatively sharp, for reasons which will hereinafter become apparent.

The bias voltage applied to the terminal 42 in Fig. 3 is such that tube $V_2$ is cut off under the condition when no signal is being received from the I. F. amplifier 22. Accordingly, when an I. F. signal is so received, the A.-C. axis 60 of this I. F. signal will pass through the cut-off point 58 of tube $V_2$. The amplitude of the I. F. signal from amplifier 22 is such that maximum swings of this signal cause the tops of the synchronizing pulses 14 to extend substantially to the cut-off level 62 of tube $V_1$. In other words, an I. F. signal of maximum carrier amplitude causes the tube $V_2$ to operate over the entire portion 54 of the grid voltage vs. plate current curve, as shown in Fig. 4.

The bias potential applied to the terminal 36 of Fig. 3 is such that the tube $V_1$ is conductive during both positive and negative swings of the input wave from the I. F. amplifier 22 which is received on the grid 28. The voltage on the cathode 26 of tube $V_1$ will vary in synchronism with this input wave, and will be similar thereto in polarity. The positive swings of the input wave will, therefore, drive the cathode 32 of tube $V_2$ more positive, and tube $V_2$ will continue to be cut-off. However, on the negative swings of the input wave, the cathode 32 will be driven more negative (or less positive), and tube $V_2$ will conduct during these intervals to produce a current flow through the load resistor 40 which may be such as represented by the curve 64 in Fig. 4. This wave 64 represents the detected television signal including both the video components and the synchronizing information since, as previously stated, the maximum swings of the input wave on grid 28 do not exceed the cut-off level 62 of tube $V_1$, and hence, $V_1$ will be conductive during the entire period of the input wave. The wave 64 is then applied through the video amplifier 48 to the control element 50 of the image-reproducing device 52 to thereby control the reproduction of the transmitted image.

When the cathode 32 of tube $V_2$ is less positive than the grid 34, grid current flows through the resistor 44. This condition occurs at the voltage level of the input wave indicated in Fig. 4 by the reference numeral 66, this voltage level substantially coinciding with the black level represented by the numeral 13 in Figs. 1 and 2. Hence, during the time that the video portion of the input signal is being received by the tubes $V_1$ and $V_2$, no grid current flows through the resistor 44. However, as soon as the voltage level corresponding to black is exceeded, the potential of the cathode 32 becomes less positive than the potential of the grid 34, and grid current flows through resistor 44 to develop thereacross a varying voltage which is representative of the synchronizing information in the television signal. The waveform of this separated synchronizing information may be such as indicated in Fig. 4 by the reference character 68.

The voltage developed across resistor 44 in the manner just described has a D.-C. component 69 which is representative of the height of the synchronizing pulses. Furthermore, since no video signal appears across resistor 44, this D.-C. component 69 will be completely independent of the video information in the received television signal, and will depend entirely on the carrier amplitude. It is, therefore, suitable for use as an automatic gain control voltage to control the gain of the I. F. (or, where desired, the R. F.) amplifier 22 over a conductor 70. The synchronizing pulses are applied over a conductor 72 to control the operation of the deflection generators (not shown) associated with the cathode ray tube 52 and thereby control the deflection in mutually perpendicular directions of the cathode ray beam developed therein.

Reference to Fig. 4 will show that any noise impulses or other high-frequency disturbances which extend beyond the top of the synchronizing pulses 14 will also extend beyond the cut-off level 62 of tube $V_1$, and hence will not appear in the output of tube $V_2$. Thus, the circuit of Fig. 3 acts as a limiter to remove these undesirable components.

Fig. 5 shows a modification of the circuit of Fig. 3 in which tube $V_1$ operates as the detector instead of tube $V_2$. The arrangement of Fig. 5 is similar to that of Fig. 3 in many respects, except that the grid resistor 44 is omitted and the biasing potentials applied to the terminals 36 and 42 are changed. These changes are such that the tube $V_1$ is biased to cut-off when no I. F. signal is being received on grid 28 from the amplifier 22.

Figure 6:
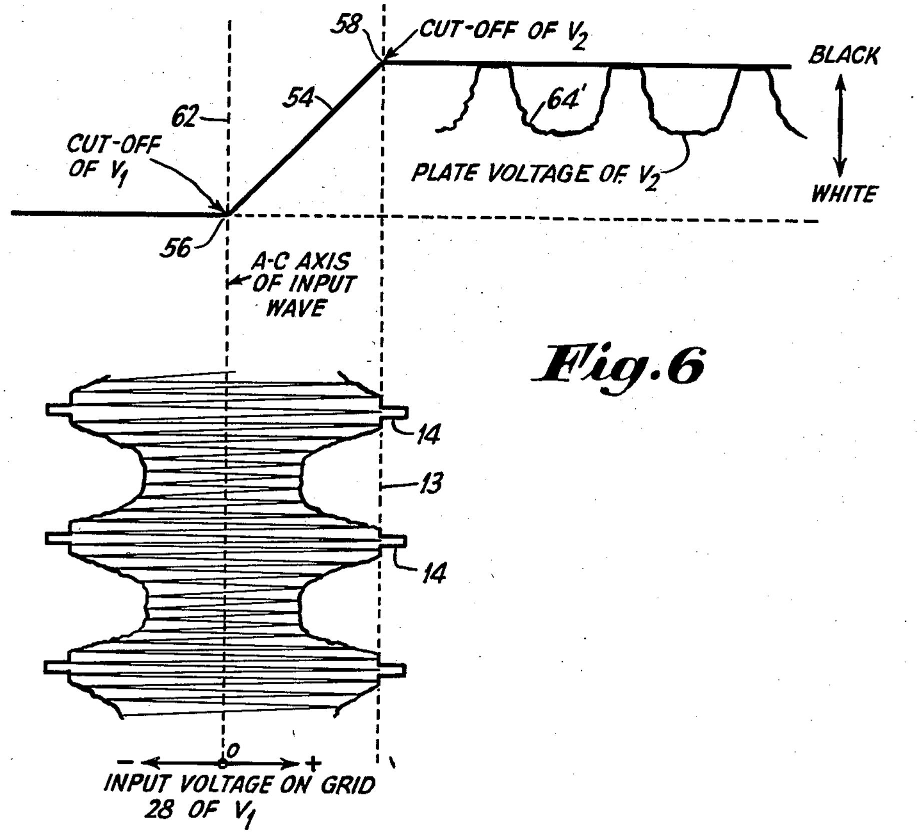
Fig. 6 is a graph referred to in explaining the operation of the circuit of Fig. 5.

The operation of the circuit of Fig. 5 is shown in the graph of Fig. 6. Since tube $V_1$ is cut-off when no signal is being received on the control electrode 28 thereof, the A.-C. axis of the input wave will substantially coincide with the cut-off level 62 of tube $V_1$, and only positive swings of the input wave will be passed by the tube. As the control electrode 28 comes positive, tube $V_1$ conducts and a detected video signal appears across the cathode resistor 46. The amplitude of this detected video signal on the cathode 32 of tube $V_2$ is such that the cut-off level of tube $V_2$ is reached when the detected video signal rises to black level (13 in Fig. 1). Hence the sync pulses 14 are not passed by tube $V_2$, and the plate current of the tube will have a waveform similar to that indicated by the reference numeral 64′ in Fig. 6, being representative of the video information alone in the transmitted television signal. It will be noted that the polarity of this signal 69 is opposite to the polarity of the output signal 64 developed across the load resistor 40 in the circuit of Fig. 3, and consequently the number of video amplifier stages 48 in Fig. 5 is selected so as to supply the video signal with correct polarity to the control element 50 of the reproducing device 52.

While in the circuit of Fig. 3 the synchronizing pulses 68 which appear across the grid resistor 44 do not have any video signal associated therewith, it will be noted that the synchronizing pulses which may be taken off across the cathode resistor 46 in the circuit of Fig. 5 by means of a lead 70 are mixed with video information. However, as previously stated, a swing of the input signal to black level causes tube $V_2$ to be driven to cut-off (Fig. 6). As soon as tube $V_2$ is cut off, it no longer acts as a load on tube $V_1$, and the output of $V_1$ is increased. Since the synchronizing pulses 14 appear on the cathode 26 of tube $V_1$ during the period when tube $V_2$ is cut off, it follows that the synchronizing pulses 14 will be increased in amplitude with respect to the video portion of the signal appearing across the cathode resistor 46. With a proper selection of values for the various circuit components, and with a proper choice of bias voltages, the amplitude ratio between the synchronizing portion of the composite signal appearing across resistor 46 and the video portion thereof may be such that the latter will have no adverse effect on the operation of the synchronizing generators. It should be emphasized, however, that the input voltage should not swing the cathode of tube $V_1$ beyond the black level 13. If such a condition should occur, part of the video portion of the input signal will be clipped off, and distortion of the reproduced image may result.

Figure 7:
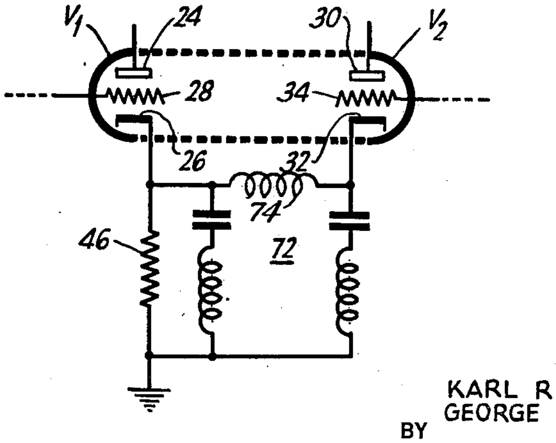
Fig. 7 is a modification of the circuit of Fig. 5.

The output of tube $V_2$ may be increased if necessary or desirable by reducing the extent by which the intermediate-frequency portion of the input signal varies the voltage on the cathode 32. It will be apparent from an inspection of Fig. 6 that a considerable part of the available range between the cut-off level 62 of the tube $V_1$ and the black level 13 representing the cut-off level of tube $V_2$ is occupied by the I. F. portion of the input wave. This I. F. portion may be materially reduced by providing a low-pass filter between the cathode 26 of tube $V_1$ and the cathode 32 of tube $V_2$. One type of low-pass filter suitable for this purpose is shown in Fig. 7 by the reference numeral 72, and comprises two series LC (inductance-capacity) combinations separated by an inductance 74. The filter 72 should preferably be arranged so as to cut off intermediate the video and I. F. frequency bands. Thus, while the video portion of the signal received from the I. F. amplifier 22 will not be materially affected by the filter 72, nevertheless the I. F. portion of the signal will be by-passed around the cathode resistor 46 to ground.

If desired, it is obvious that other means of by-passing the I. F. portion of the input signal may be utilized in place of the particular filter arrangement 72. For example, only one LC circuit may be employed, or even a single capacitor, according to the degree of I. F. attenuation desired.

The following values have been found suitable in practice for the various circuit components and potentials described above. However, it should be understood that they are being given merely as an illustration, and that other values may be substituted therefor as may be necessary or desirable:

Tubes $V_1$ and $V_2$, type 6J6
Resistor 46 (Fig. 3), 15,000 ohms
Resistor 46 (Fig. 5), 10,000 ohms
Voltage at point 36 (Fig. 3), +175 volts
Voltage at point 36 (Fig. 5), +120 volts
Voltage at point 42 (Fig. 3), +165 volts
Voltage at point 42 (Fig. 5), +130 volts
Voltage at point 38 (both Figs. 3 and 5), +300 volts
Resistor 40 (both Figs. 3 and 5), 3900 ohms
Peak-to-peak value of input voltage on grid 28 of Fig. 3, 28 volts
Peak-to-peak value of input voltage on grid 28 of Fig. 5, 50 volts
Resistor 44 (Fig. 3), 3900 ohms

Having thus described our invention, we claim:

1. In a television receiver including an input amplifier: the combination of a first statically conductive electron discharge tube and a second statically non-conductive electron discharge tube, each of said tubes having at least an anode, a cathode, and a control electrode; means connecting together the cathodes of said tubes; an impedance; means connecting the joined cathodes of said tubes to a point of fixed potential through said impedance; means for applying the signal output of said input amplifier to the control electrode of said first statically conductive tube such as to develop across said impedance a signal having a waveform substantially similar to the signal output of said input amplifier; a resistor in the anode-cathode circuit of said second statically non-conductive tube across which resistor the signal developed on said impedance is detected; and a circuit for biasing the control electrode of said first tube so that the cut-off level of the latter will be reached at approximately the maximum anode-cathode current amplitude corresponding to the signal detected by the said second tube.

2. A television receiver according to claim 1, in which said second statically non-conductive tube is biased to cut-off by means including a further resistor, the value of the bias voltage being so chosen that current will flow through this further resistor only when the amplitude of the input signal detected by said second tube rises above a predetermined level.

3. A television receiver according to claim 1, in which said second statically non-conductive tube is biased to cut-off by means including a further resistor, the value of the bias voltage being so chosen that current will flow through this further resistor only when the amplitude of the input signal detected by said second tube rises above the level corresponding to black in the video portion of the received television signal.

4. A television receiver according to claim 1, further comprising a connection between the control electrode of said second tube and said input amplifier, whereby variations in the potential of said control electrode will be applied to control the gain of said amplifier.

5. In a television receiver adapted to receive a composite television signal: a pair of cathode-coupled electron discharge tubes each having at least one grid; means for applying a received undetected composite television signal to the grid of one of said tubes; means for biasing the other of said tubes to develop a detected composite television signal in the anode-cathode circuit thereof; and means for biasing said one tube to cut off at a level substantially coinciding with the top of the synchronizing pulses contained in the composite television signal detected by said other tube, whereby spurious high-frequency components contained in the said undetected signal will be limited in amplitude to the amplitude of the said synchronizing pulses.

6. A televison receiver according to claim 5 further comprising an impedance in the grid-cathode circuit of the said other tube, the bias on the latter being so chosen that grid current will flow through said impedance only during detection by said other tube of the synchronizing pulses contained in the said composite television signal.

7. In a television receiver including an I. F. amplifier: a pair of cathode-coupled electron discharge devices each having at least one grid; a resistor connecting the joined cathodes of said electron discharge devices to ground; a source of operating potential for the said electron discharge devices; means connecting the grid of one of said electron discharge devices to said I. F. amplifier; means for biasing the other of said electron discharge devices substantially to cut-off when no signal is being received from said I. F. amplifier on the grid of said one electron discharge device; and means for applying to said one electron discharge device a bias voltage of such value that the latter will be driven substantially to cut-off when a composite television signal of maximum carrier amplitude is being passed by the said other electron discharge device.

8. A television receiver according to claim 7, in which said means for biasing the other of said electron discharge devices substantially to cut-off includes means for applying a positive potential to the grid of the said other electron discharge device which is substantially equal in value to the positive potential of the cathode of said other electron discharge device when a signal is being received on said cathode of a voltage corresponding to black in the video portion of the composite television signal.

9. A television receiver according to claim 7, further comprising a connection between the grid of the said other electron discharge device and said I. F. amplifier, whereby variations in the potential of said grid will be applied to control the gain of said amplifier.

KARL RINNER WENDT.
GEORGE CLIFFORD SZIKLAI.

REFERENCES CITED

The following references are of record in the file of this patent:

UNITED STATES PATENTS

| Number | Name | Date |
|---|---|---|
| 1,909,239 | Travis | May 16, 1933 |
| 2,083,243 | Schade | June 8, 1937 |
| 2,226,994 | Schlesinger | Dec. 31, 1940 |
| 2,276,565 | Crosby | Mar. 17, 1942 |
| 2,307,375 | Blumlein et al. | Jan. 5, 1943 |
| 2,356,141 | Applegarth | Aug. 22, 1944 |
| 2,363,800 | Moffett | Nov. 28, 1944 |